Dec. 5, 1967     C. PARATTE     3,355,874
ARRANGEMENT FOR WATERTIGHT ASSEMBLY
OF A WATCH-CASE CRYSTAL
Filed Jan. 7, 1966
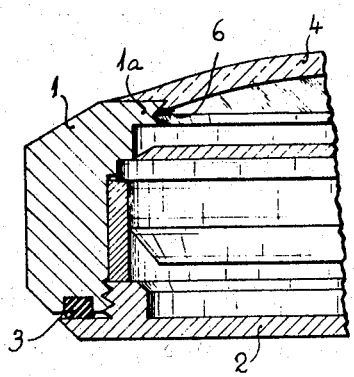
FIG. 1
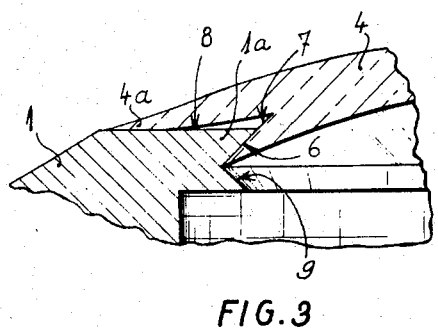
FIG. 2
FIG. 3
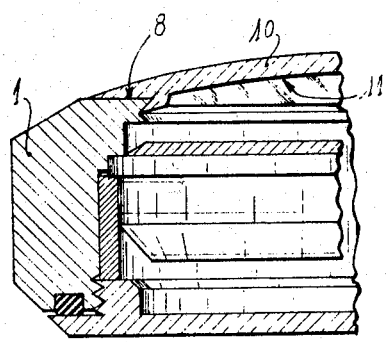
FIG. 4
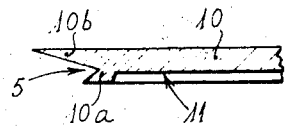
FIG. 5
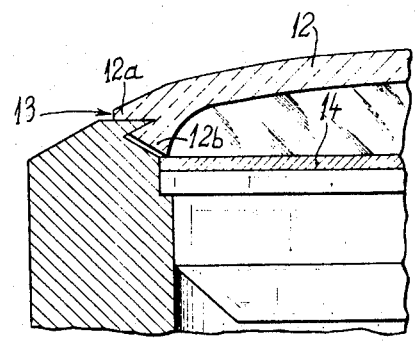
FIG. 6
INVENTOR
Charles PARATTE 3,355,874
ARRANGEMENT FOR WATERTIGHT ASSEMBLY
OF A WATCH-CASE CRYSTAL
Charles Paratte, Viganello-Lugano, Tessin, Switzerland
Filed Jan. 7, 1966, Ser. No. 519,264
Claims priority, application Switzerland, Jan. 21, 1965,
898/65
4 Claims. (Cl. 58—90)

The present invention relates to an arrangement of a watertight assembly of a watch-case crystal (the glass covering the dial) with its mounting, and more particularly to an arrangement of the kind in which the mounting carries an annular projection which resiliently engages in a peripheral groove provided in the crystal and, as a result, produces a reaction force which acts on the periphery of the crystal to cause such crystal to bear tightly against the mounting in the axial direction.

In the arrangement according to the present invention, the peripheral groove in the crystal is bounded on the outside by a lip on the crystal of which at least the peripheral portion is flexible and resilient, such peripheral portion being deformed by the mounting resiliently to bear against the outer surface of such mounting, thus forming a watertight joint, due to the action of the axial reaction force.

The drawings show, by way of example, three embodiments of the invention.

In the drawings,

FIGURE 1 is a partial axial section of a first embodiment of a case of a bracelet watch, FIGURE 2 is a partial axial section of the crystal for the watch-case of FIGURE 1, prior to fitting, FIGURE 3 is an enlarged view of a detail of FIGURE 1, FIGURE 4 is a partial axial section of a second embodiment of a case of a bracelet watch, FIGURE 5 is a partial section of the crystal for the watch-case of FIGURE 4, but not fitted in position, and FIGURE 6 is a partial section of a third embodiment.

The watch-case shown in FIGURE 1 comprises a watch-case rim 1 into which there is screwed a back cover 2 with the interposition of a watertight packing 3. The crystal, indicated at 4, and flat when not fitted in position (FIGURE 2), possesses at its periphery a V-shaped groove 5 which resiliently engages a bezel 1a combined with the rim 1, such bezel 1a having an annular projection of shape corresponding to that of the groove 5. The reaction between the sloping surfaces 6 and 7, of the bezel 1a and of the crystal 4 respectively, gives rise to an axial force that tends to maintain the crystal closely against the combined rim 1 and bezel 1a.

The groove 5 is bounded on the outside by a lip 4a of the crystal 4 that has a V-shaped cross-section that becomes thinner towards the periphery of the crystal. The peripheral portion of such lip 4a is thus flexible and can be resiliently deformed. When the crystal is properly mounted on the combined rim 1 and bezel 1a, a procedure that causes such crystal to assume a slightly convex shape, the axial reaction pressure maintains the lip 4a against the upper surface 8 of the combined rim and bezel and deforms the peripheral portion of the lip 4a (FIGURE 3) in the manner of deformation of a spatula. The peripheral portion of the lip 4a thus forms a watertight joint with the surface 8 of the combined rim 1 and bezel 1a. The watertightness of the case is further improved by the tight contact of the surfaces 6 and 7, respectively on the bezel 1a and on the crystal, which tight contact likewise establishes a watertight joint.

It should be noted that the bezel 1a of the rim 1 offers a surface 9 of truncated conical form and which forms an accentuation or highlight for the dial of the watch.

The embodiment in FIGURES 4 and 5 differs from the first embodiment by reason of the fact that the crystal, indicated at 10, is reduced in thickness over its main portion. The reduced portion, indicated at 11, gives rise to an annular rib 10a on the crystal in which the annular groove 5 is formed. Such groove 5 is bounded on the outside by a lip 10b that is flexible and resilient and that bears against the upper surface 8 of the combined rim 1 and bezel 1a in the manner above-described in respect of the first embodiment.

The above-described embodiments concern watchcases with removable back covers, and the crystals therefor are designed accordingly. Assembly takes place by causing the combined rim 1 and bezel 1a to circumferentially engage the crystal when the latter, flat in its normal state, is maintained in a state of convexity by use of a suitable tool acting on the innerface of the crystal through the open back of the case.

In the case of a so-called "monobloc" case which has a back cover and rim formed as one piece, it is necessary to be able to grip the crystal by its periphery with the assistance of specially adapted pliers, so as to make it assume a convex shape, and then to place it in position. With this in view, the lip 12a of the crystal 12 in FIGURE 6 is truncated so as to provide a lateral surface 13 to afford a purchase for such pliers. Furthermore, the crystal 12 possesses a projection 12b that rests on the dial of the watch, indicated at 14 and forming part of the watch movement, which is placed in the case from above, the projection 12b serving to keep such movement in position. It should be noted that this arrangement would be likewise applicable to cases, other than so-called monobloc cases, in which the back cover and the rim are formed as one piece, and more especially to any watch in which the dial is said to be "free," that is, in which the dial is located above the base of the accentuation or highlight.

As a variant, the annular groove of the crystal, as also the corresponding projection on the mounting, may have other profiles than the V profile described and illustrated.

The present disposition not only ensures a double watertight joint in the case, as has been mentioned, but also prevents the crystal from being inopportunely separated from its mounting, by reason of the fact that the lip of the crystal, which bears on the outer surface of the mounting, assists in keeping the crystal in position.

From the aesthetic point of view, as well, the present arrangement has the advantage that the crystal offers an outer surface that is practically continuous with its mounting, and that the depth of the case may be kept small.

What I claim is:

1. An arrangement for effecting a watertight assembly of a watch-case comprising a watch-case crystal, a mounting for said crystal, said crystal having a peripheral groove, said mounting including an annular projection which resiliently engages in said peripheral groove in the crystal to exert an axial force on the crystal which causes the crystal to bear against the mounting on the outer surface thereof, said crystal including an elongated lip with a peripheral portion which is flexible and resilient, said lip bounding said peripheral groove in the crystal and being disposed on the outer surface of the mounting with the annular projection of the mounting engaged in said peripheral groove such that said peripheral portion of the said lip is in deformed engagement with the mounting through the action of said axial force, thus forming a watertight joint therewith.

2. An arrangement as claimed in claim 1, wherein the said lip tapers in thickness towards the periphery of the crystal.

3. An arrangement as claimed in claim 1, wherein the annular projection and said groove are of V-shape, the engagement of the said annular projection of the mounting in the said peripheral groove constituting a second watertight joint.

4. An arrangement as claimed in claim 1 wherein said crystal has a central body of reduced thickness compared to the thickness of the crystal at said peripheral groove.

References Cited

UNITED STATES PATENTS

| | | | |
|---|---|---|---|
| 1,288,305 | 12/1918 | Wachter | 58—91 |
| 1,288,306 | 12/1918 | Wachter | 58—91 |
| 1,288,308 | 12/1918 | Wachter | 58—91 |
| 2,607,082 | 8/1952 | Starke | 58—91 |

STEPHEN J. TOMSKY, *Primary Examiner.*

RICHARD B. WILKINSON, *Examiner.*

L. M. LORCH, *Assistant Examiner.*